United States Patent
Wong et al.

(10) Patent No.: US 10,308,777 B2
(45) Date of Patent: Jun. 4, 2019

(54) PYROLIZED ORGANIC LAYERS AND CONDUCTIVE PREPREGS MADE THEREWITH

(71) Applicant: Henkel IP & Holding GmbH, Duesseldorf (DE)

(72) Inventors: Raymond S. Wong, San Ramon, CA (US); Huabing Zheng, Concord, CA (US)

(73) Assignee: Henkel IP & Holding GmbH, Duesseldorf (DE)

( * ) Notice: Subject to any disclaimer, the term of this patent is extended or adjusted under 35 U.S.C. 154(b) by 395 days.

(21) Appl. No.: 15/016,381

(22) Filed: Feb. 5, 2016

(65) Prior Publication Data

US 2016/0194469 A1  Jul. 7, 2016

Related U.S. Application Data

(63) Continuation of application No. PCT/US2014/051984, filed on Aug. 21, 2014.

(Continued)

(51) Int. Cl.
*B32B 27/12* (2006.01)
*C08J 5/24* (2006.01)

(Continued)

(52) U.S. Cl.
CPC ............ *C08J 5/24* (2013.01);
*B32B 5/00* (2013.01); *B32B 5/02* (2013.01);
*B32B 5/024* (2013.01); *B32B 5/26* (2013.01);
*B32B 7/00* (2013.01); *B32B 7/02* (2013.01);
*B32B 7/10* (2013.01); *B32B 15/00* (2013.01);
*B32B 15/04* (2013.01); *B32B 15/08* (2013.01);
*B32B 15/14* (2013.01); *B32B 15/20* (2013.01);
*B32B 27/00* (2013.01); *B32B 27/06* (2013.01);
*B32B 27/12* (2013.01); *B32B 27/16* (2013.01);
*B32B 27/18* (2013.01); *B32B 27/28* (2013.01);
*B32B 27/281* (2013.01); *C08J 5/005* (2013.01); *C08J 5/042* (2013.01); *H01B 1/20* (2013.01); *H01B 1/24* (2013.01);

(Continued)

(58) Field of Classification Search
CPC .................................................. B32B 27/12
See application file for complete search history.

(56) References Cited

U.S. PATENT DOCUMENTS

| | | | | |
|---|---|---|---|---|
| 4,469,984 A | * | 9/1984 | Sergeev | H01J 9/14 313/348 |
| 4,606,955 A | * | 8/1986 | Eastman | H01B 1/24 428/116 |

(Continued)

FOREIGN PATENT DOCUMENTS

| | | |
|---|---|---|
| EP | 1600469 | 4/2012 |
| RU | 2493057 | 9/2013 |

(Continued)

OTHER PUBLICATIONS

International Search Report issued in connection with International Patent Application No. PCT/US2014/051984 dated Dec. 11, 2014.

(Continued)

*Primary Examiner* — Andrew T Piziali
(74) *Attorney, Agent, or Firm* — Steven C. Bauman

(57) ABSTRACT

Pyrolized organic layers and conductive prepregs made therewith are provided.

25 Claims, 1 Drawing Sheet

Conductive Prepreg Features and Zone 3 Strike Performance

| | | | | | 8 Ply Lightning Strike Performance | | | |
|---|---|---|---|---|---|---|---|---|
| Matrix Resin | Matrix Resin Additive, Wt % | Conductive Ply | Conductivity, Siemens/m | Conductive Ply Weight, gsm | Pass/Fail | Damage Area, $cm^2$ | Number of Damaged Prepreg Plies |
| Benzoxazine | None | Copper mesh embedded in epoxy film | 3.85 | 221 | Pass | 132 | Copper vaporized and top prepreg layer scorched |
| Epoxy | None | None | 0.1 | 0 | Fail | 225 | 8 |
| Benzoxazine | None | None | 0.35 | 0 | Fail | 387 | 8 |
| Benzoxazine | 2, carbon nanotube | None | 6.37 | 0 | Pass | 218 | Top 2 to 3 |
| Benzoxazine | 2, carbon nanotube | Pyrolized layer | 9.26 | 10 | Pass | 117 | Top 2 to 3 |

Related U.S. Application Data

(60) Provisional application No. 61/881,601, filed on Sep. 24, 2013.

(51) Int. Cl.

| | | |
|---|---|---|
| *B32B 15/08* | (2006.01) | |
| *H01B 1/20* | (2006.01) | |
| *B32B 5/26* | (2006.01) | |
| *B32B 15/14* | (2006.01) | |
| *B32B 15/20* | (2006.01) | |
| *B32B 27/28* | (2006.01) | |
| *B32B 5/02* | (2006.01) | |
| *C08J 5/00* | (2006.01) | |
| *C08J 5/04* | (2006.01) | |
| *H01B 1/24* | (2006.01) | |
| *B32B 5/00* | (2006.01) | |
| *B32B 7/00* | (2019.01) | |
| *B32B 7/02* | (2019.01) | |
| *B32B 7/10* | (2006.01) | |
| *B32B 15/00* | (2006.01) | |
| *B32B 15/04* | (2006.01) | |
| *B32B 27/00* | (2006.01) | |
| *B32B 27/06* | (2006.01) | |
| *B32B 27/16* | (2006.01) | |
| *B32B 27/18* | (2006.01) | |

(52) U.S. Cl.
CPC ... *B32B 2260/023* (2013.01); *B32B 2260/046* (2013.01); *B32B 2262/00* (2013.01); *B32B 2262/02* (2013.01); *B32B 2262/0269* (2013.01); *B32B 2262/10* (2013.01); *B32B 2262/101* (2013.01); *B32B 2262/106* (2013.01); *B32B 2264/00* (2013.01); *B32B 2307/00* (2013.01); *B32B 2307/20* (2013.01); *B32B 2307/202* (2013.01); *B32B 2307/30* (2013.01); *B32B 2307/302* (2013.01); *B32B 2307/50* (2013.01); *B32B 2307/54* (2013.01); *B32B 2307/542* (2013.01); *B32B 2307/558* (2013.01); *B32B 2307/732* (2013.01); *B32B 2605/00* (2013.01); *B32B 2605/18* (2013.01); *C08J 2379/04* (2013.01)

(56) References Cited

U.S. PATENT DOCUMENTS

| | | | |
|---|---|---|---|
| 4,607,091 | A | 8/1986 | Schreiber |
| 5,021,484 | A | 6/1991 | Schreiber et al. |
| 5,200,452 | A | 4/1993 | Schreiber |
| 5,445,911 | A | 8/1995 | Russell et al. |
| 6,207,786 | B1 | 3/2001 | Ishida et al. |
| 7,585,349 | B2 | 9/2009 | Xia et al. |
| 7,922,787 | B2 | 4/2011 | Wang et al. |
| 8,049,333 | B2 | 11/2011 | Alden et al. |
| 8,178,606 | B2 | 5/2012 | Sang et al. |
| 8,454,859 | B2 | 6/2013 | Lowenthal et al. |
| 2004/0071990 | A1 | 4/2004 | Moriyama et al. |
| 2006/0052509 | A1 | 3/2006 | Saitoh |

FOREIGN PATENT DOCUMENTS

| | | |
|---|---|---|
| WO | 1999023152 | 5/1999 |
| WO | 2004001107 | 12/2003 |
| WO | 2006008518 | 1/2006 |
| WO | 2008048705 | 1/2009 |
| WO | 2009118509 | 10/2009 |
| WO | 2010108723 | 9/2010 |
| WO | 2011075344 | 6/2011 |

OTHER PUBLICATIONS

S. Rimdusit and H. Ishida, "Development of new class of electronic packaging materials based on ternary system of benzoxazine, epoxy, and phenolic resin," Polymer, 41, 7941-49 (2000).

\* cited by examiner

Conductive Prepreg Features and Zone 3 Strike Performance

| Matrix Resin | Matrix Resin Additive, Wt % | Conductive Ply | Conductivity, Siemens/m | Conductive Ply Weight, gsm | 8 Ply Lightning Strike Performance ||| 
|---|---|---|---|---|---|---|---|
| | | | | | Pass/Fail | Damage Area, cm² | Number of Damaged Prepreg Plies |
| Benzoxazine | None | Copper mesh embedded in epoxy film | 3.85 | 221 | Pass | 132 | Copper vaporized and top prepreg layer scorched |
| Epoxy | None | None | 0.1 | 0 | Fail | 225 | 8 |
| Benzoxazine | None | None | 0.35 | 0 | Fail | 387 | 8 |
| Benzoxazine | 2, carbon nanotube | None | 6.37 | 0 | Pass | 218 | Top 2 to 3 |
| Benzoxazine | 2, carbon nanotube | Pyrolized layer | 9.26 | 10 | Pass | 117 | Top 2 to 3 |

PYROLIZED ORGANIC LAYERS AND CONDUCTIVE PREPREGS MADE THEREWITH

BACKGROUND

Field

Pyrolized organic layers and conductive prepregs made therewith are provided.

Brief Description of Related Technology

Epoxy resins with various hardeners have been used extensively in the aerospace industry, both as adhesives and as matrix resins for use in prepreg assembly with a variety of substrates.

Blends of epoxy resins with other resins are known. See e.g. U.S. Pat. No. 4,607,091 (Schreiber), U.S. Pat. No. 5,021,484 (Schreiber), U.S. Pat. No. 5,200,452 (Schreiber), and U.S. Pat. No. 5,445,911 (Schreiber). These blends appear to be potentially useful in the electronics industry as the epoxy resins can reduce the melt viscosity of oxazines allowing for the use of higher filler loading while maintaining a processable viscosity. However, epoxy resins oftentimes undesirably increase the temperature at which oxazines polymerize.

Ternary blends of epoxy resins are also known. See U.S. Pat. No. 6,207,786 (Ishida), and S. Rimdusit and H. Ishida, "Development of new class of electronic packaging materials based on ternary system of benzoxazine, epoxy, and phenolic resin," *Polymer*, 41, 7941-49 (2000).

U.S. Pat. No. 8,178,606 is directed to and claims a composite structure comprising a conductive surfacing film formed on a prepreg layup, where the surfacing film comprises silver flakes distributed substantially uniformly throughout the film in a substantially interconnected, lamellar configuration. The surfacing film of the '606 patent is formed from a curable thermosetting composition, which is defined to have at least one multifunctional epoxy resin; at least one curing agent selected from aromatic primary amines, bisureas, boron trifluoride complexes, and dicyandiamide; at least one toughening agent having a functional group selected from epoxy groups, carboxylic acid groups, amino groups and hydroxyl groups capable of reacting with other components of the composition; non-conductive fillers; silver flakes in an amount greater than about 35 wt. %, based on the total weight of the composition. The surfacing film has an electrical resistivity of less than 500 mΩ/sq and a film weight in the range of 0.01-0.15 psf (pounds per square foot). The prepreg layup is comprised of a plurality of prepreg layers, each of the prepreg layers being formed from a sheet of fibers impregnated with a matrix material.

U.S. Patent Application Publication No. 2004/0071990 is directed to an electrically conductive layer, comprising a continuous or discontinuous, non-conductive first phase comprising a polyimide base polymer, and a discontinuous, conductive second phase comprising 80, 85, 90, 95, 96, 97, 98, 99 or 100 weight percent carbon nanotube particles, where the weight percent of the second phase, based upon the total weight of both phases, is in a range between any two of the following percentages: 0.10, 0.20, 0.30, 0.40, 0.50, 0.75, 1.0, 2.0, 3.0, 4.0, 5.0, 10.0, 15.0, 20.0, 25.0, 30.0 35.0, 40.0, 45.0, 46, 47, 48, 49, and 50%, where the layer has a thickness between two and 500 microns, and where the layer or a precursor thereto is oriented on a molecular scale in one or more directions to provide a surface electrical resistivity between, and including, any two of the following 50, 75, 100, 250, 500, 750, $1\times10^1$, $1\times10^2$, $1\times10^3$, $1\times10^4$, $1\times10^5$, $1\times10^6$, $1\times10^7$, $1\times10^8$, $1\times10^9$, $1\times10^{10}$, $1\times10^{11}$, $1\times10^{12}$, $1\times10^{13}$, $1\times10^{14}$, and $1\times10^{15}$ ohms per square.

U.S. Patent Application Publication No. 2006/0052509 is directed to a carbon nanotube composition that contains a conducting polymer (a), a solvent (b) and carbon nanotubes (c).

International Patent Publication No. 2004/001107 is directed to a method of forming carbon nanotube-filled composites using miniemulsion polymerization. The carbon nanotubes are preferably single-walled carbon nanotubes. The carbon nanotubes are highly dispersed within and associated with the polymer comprising the composite.

European Patent Publication No. EP 1 600 469 is directed to a carbon fiber composite material including a thermoplastic resin; carbon nanofibers dispersed in the thermoplastic resin; and dispersing particles which promote dispersion of the carbon nanofibers in the thermoplastic resin.

International Patent Publication No. 2006/008518 is directed to a protective device for a glazed structure, in particular an aircraft windscreen, comprises at least one removable sacrificial sheet of transparent composite. The composite comprises a transparent polymeric film having on one side an electrically conductive layer formed from a dispersion of electrically conductive particles and which is coated with a transparent hard coat, with the other side having adhesive layer thereon. Sheets of the composite may be arranged in a stack so that each sheet adheres to the adjacent underneath sheet with the uppermost sheet of each stack being removable as the sheet becomes damaged and/or dirty.

International Patent Publication No. 2008/048705 is directed to surface films, paints, or primers can be used in preparing aircraft structural composites that may be exposed to lightning strikes. The surface film can include a thermoset resin or polymer, e.g., an epoxy resin and/or a thermoplastic polymer, which can be cured, bonded, or painted on the composite structure. Low-density electrically conductive materials are disclosed, such as carbon nanofiber, copper powder, metal coated microspheres, metal-coated carbon nanotubes, single wall carbon nanotubes, graphite nanoplatelets and the like, that can be uniformly dispersed throughout or on the film. Low density conductive materials can include metal screens, optionally in combination with carbon nanofibers.

International Patent Publication No. 2011/075344 is directed to metal- or metal alloy-coated sheet materials including, but not limited to, fabrics and veils which have a metal content of between one (1) and fifty (50) grams per square meter ("gsm"). The metal-coated sheet materials may be used as-is or in conjunction with prepregs, adhesives or surfacing films to provide lightning strike protection ("LSP") and/or bulk conductivity, among other benefits, to the resultant composite article. The resultant metal-coated fabric or veil is reportedly useful as a carrier in surfacing films to impart surface conductivity; as a carrier in adhesives to form conductive adhesive-bonded joints; as an interleaf (one or more metal-coated veils) between layers of prepreg to impart surface and/or bulk conductivity as well as toughness; or to fabricate composite articles.

Notwithstanding the state of the technology, there is a need for new pyrolized organic layers that are particularly useful in making conductive prepregs, which have the capacity to generate improved conductivity without increasing the weight of the part made therefrom, and desirably decreasing the weight of the part. That need has remained unsolved, despite the state of the art, until now.

SUMMARY

Accordingly, in broad strokes, provided herein in one aspect is a pyrolized organic layer on at least a portion of a surface of which is disposed conductive metal.

In another aspect, provided herein is a conductive prepreg, which comprises
A matrix resin;
Fiber; and
One or more of the pyrolized organic layer(s), as described above and in more detail below.

In still another aspect, a method of substantially maintaining electrical conductivity of a conductive prepreg while reducing the overall weight of the conductive prepreg is provided. The method includes the steps of
Providing a matrix resin and fiber; and
Providing one or more of the pyrolized organic layer(s), as described above and in more detail below.

The present invention will be more fully understood by a reading of the following detailed description.

BRIEF DESCRIPTION OF THE FIGURE

FIG. 1 is a table showing comparative test data of prepregs made from carbon fiber and a matrix resin based upon epoxy or benzoxazine and conductive ply.

DETAILED DESCRIPTION

As noted above, in one aspect a pyrolized organic layer on at least a portion of a surface of which is disposed conductive metal is provided. The conductive metal disposed on the pyrolized organic layer desirably is made from copper, silver or nickel.

The organic layer that is pyrolized to form the pyrolized organic layer desirably should be made from polyimide. The pyrolized organic layer should also have a thickness of about 10 to 100 um, such as about 25 to about 40 um. A commercial example of such a pyrolized polyimide is sold under the tradename GRAPHINITY by Kaneka Corporation, Tokyo, Japan. GRAPHINITY is promoted by Kaneka as having high thermal conductivity in planar direction—1,500 W/mk, which is more than three times that of copper and six times that of aluminum; being light weight—density about 2 g/cm$^3$ and available at a thickness of 25 um and 40 um; high electromagnetic shielding effect; and extremely low water absorption. Pyrolysis is the reduction of a carbon containing material to a ring structure of carbon similar to graphite. The degree to which the starting material is converted to carbon ring structure will depend on the chemical composition of the starting material, the elevated time/temperature exposure and the atmosphere of exposure. The pyrolysis conditions under argon atmosphere for a DuPont Kapton polyimide film described in Hu, C. Z. and Andrade, J. D., "Pyrolyzed, Conducting Kapton Polyimide: An Electrically Conducting Material", Journal of Applied Polymer Science, Vol. 30, 4409-4415 (1985) begins with the breaking of bonds around 500° C. and follows with the development of an amorphous carbon matrix at higher temperatures. The level of pyrolysis of the film is a balance between conductivity and structural integrity needed for industrial processes.

The conductive metal may be disposed on the pyrolized organic layer at a thickness of about 1 to about 10 um, desirably about 2 to about 4 um.

In yet another aspect, a conductive prepreg is provided, which comprises
A matrix resin;
Fiber; and
One or more of the pyrolized organic layer(s).

The matrix resin used in the conductive prepreg may be chosen from one or more epoxies, episulfides, oxetanes, thioxetanes, maleimides, nadimides, itaconimides, oxazines (such as benzoxazines), cyanate esters, oxazolines, phenolics, thiophenolics and combinations thereof.

Where the matrix resin includes as at least a portion thereof an oxazine, the oxazine may be embraced by the following structure:

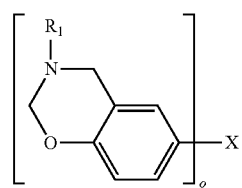

I where o is 1-4, X is selected from a direct bond (when o is 2), alkyl (when o is 1), alkylene (when o is 2-4), carbonyl (when o is 2), thiol (when o is 1), thioether (when o is 2), sulfoxide (when o is 2), and sulfone (when o is 2), and $R_1$ is selected from hydrogen, alkyl and aryl.

More specifically, the oxazine may be embraced by the following structure:

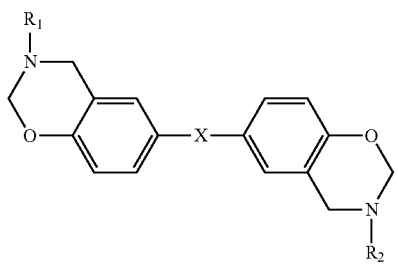

II where X is selected from of a direct bond, $CH_2$, $C(CH_3)_2$, C=O, S, S=O and O=S=O, and $R_1$ and $R_2$ are the same or different and are selected from hydrogen, alkyl, such as methyl, ethyl, propyls and butyls, and aryl.

The oxazine thus may be selected from any of the following exemplified structures:

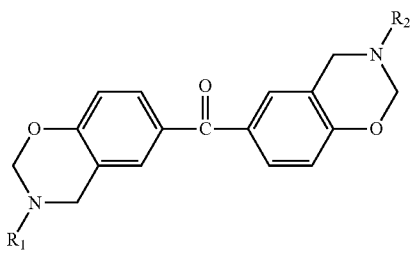

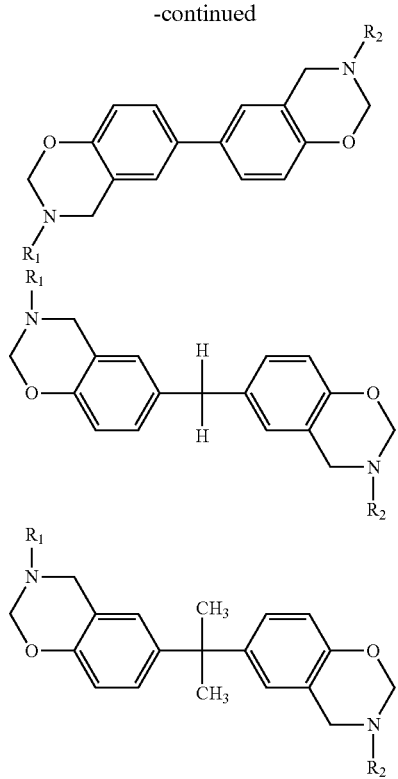
where $R_1$ and $R_2$ are as defined above.
Though not embraced by either oxazine structure I or II, additional oxazines may be embraced by:
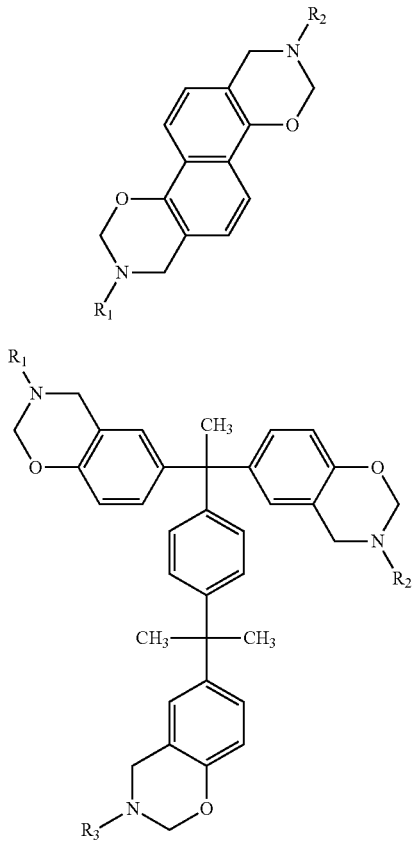
where $R_1$ are $R_2$ are as defined above, and $R_3$ is defined as $R_1$ or $R_2$.
Specific examples of these oxazines therefore include:
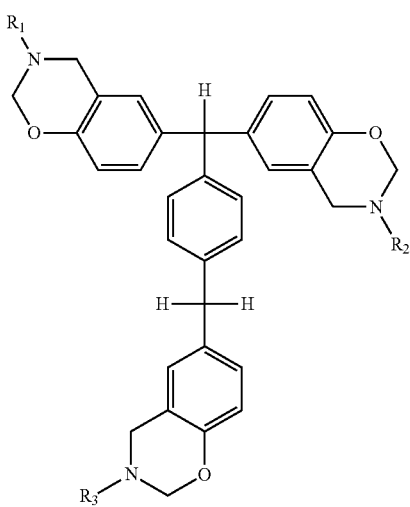
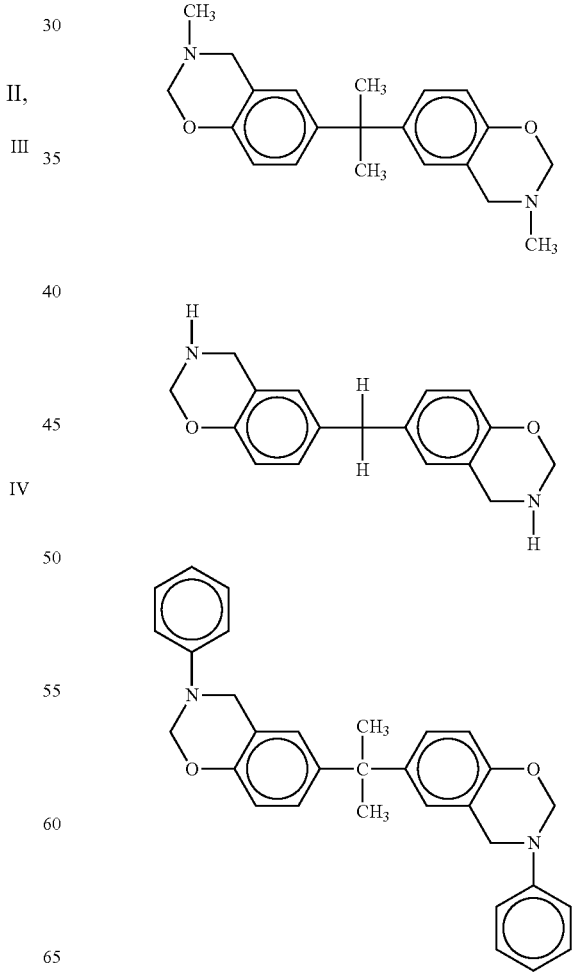

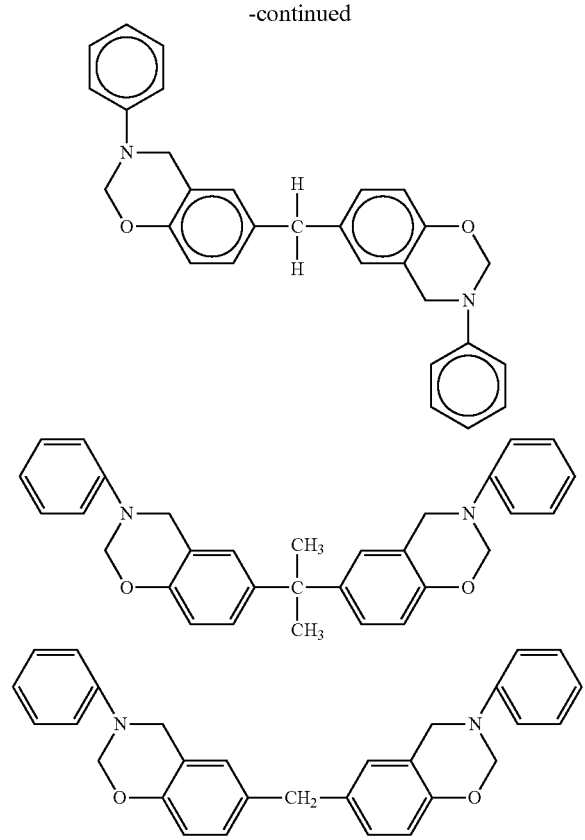

The oxazine may include the combination of multifunctional oxazines and monofunctional oxazines. Examples of monofunctional oxazines may be embraced by the following structure:

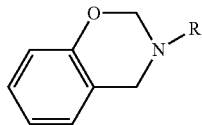

where R is alkyl, such as methyl, ethyl, propyls and butyls.

As the oxazoline, compounds embraced by the following structure are suitable:

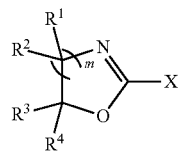

where $R^1$, $R^2$, $R^3$, $R^4$, and X are hydrogen or as regards x a direct bond to a divalent organic radical, and m is 1.

Exemplary oxazolines have the following structure:

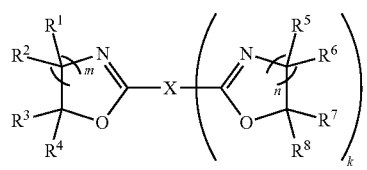

in which k is 0-6; m and n are each independently 1 or 2 provided that at least one of m or n is 1; X is a monovalent or polyvalent radical selected from branched chain alkyl, alkylene, alkylene oxide, ester, amide, carbamate and urethane species or linkages, having from about 12 to about 500 carbon atoms; and $R^1$ to $R^8$ are each independently selected from $C_{1-40}$ alkyl, $C_{2-40}$ alkenyl, each of which being optionally substituted or interrupted by one or more —O—, —NH—, —S—, —CO—, —C(O)O—, —NHC(O)—, and $C_{6-20}$ aryl groups.

The oxazolines include 4,4',5,5'-tetrahydro-2,2'-bis-oxazole, 2,2'-bis(2-oxazoline); a 2,2'-(alkanediyl) bis [4,4-dihydrooxazole], e.g., 2,2'-(2,4-butanediyl) bis [4,5-dihydrooxazole] and 2,2'-(1,2-ethanediyl) bis [4,5-dihydrooxazole]; a 2,2'-(arylene) bis [4,5-dihydrooxazole]; e.g., 2,2'-(1,4-phenylene)bis (4,5-dihydrooxazole], 2,2'-(1,5-naphthalenyl) bis (4,5-dihydrooxazole], 2,2'-(1,3-phenylene) bis [4,5-dihydrooxazole), and 2,2'-(1,8-anthracenyl) bis [4,5-dihydrooxazole; a sulfonyl, oxy, thio or alkylene bis 2-(arylene) [4,5-dihydrooxazole, e.g., sulfonyl bis 2-(1,4-phenylene) [4,5-dihydrooxazole], thio bis 2,2'-(1,4-phenylene) [4,5-dihydrooxazole] and methylene bis 2,2'-(1,4-phenylene) [4,5-dihydrooxazole]; a 2,2',2"-(1,3,5-arylene) tris [4,5-dihydrooxazole, e.g., 2,2',2"-tris (4,5-dihydrooxazole]1,3,5-benzene; a poly [(2-alkenyl) 4,5-hydrooxazole], e.g., poly[2-(2-propenyl)4,5-dihydrooxazole], and others and mixtures thereof.

The oxazolines may have one or more of the following structures:

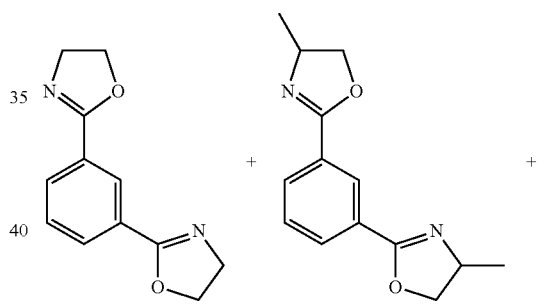

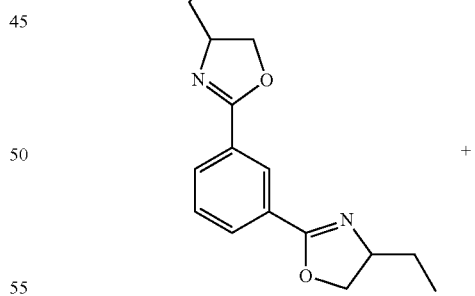

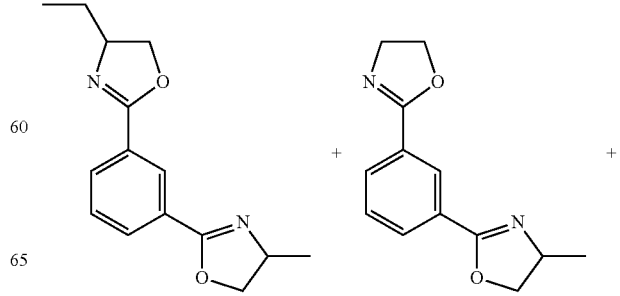

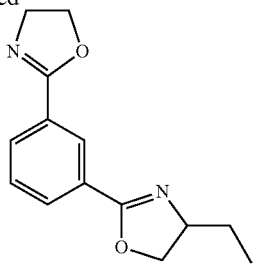

When the matrix resin includes at least in part an epoxy, in general, a large number are suitable. The epoxy should have at least about two 1,2-epoxy groups per molecule, though epoxy compounds with only one epoxy group may also be used. The epoxy may be attached to a substrate that is saturated, unsaturated, cyclic or acyclic, aliphatic, alicyclic, aromatic or heterocyclic. Examples of suitable epoxies include polyglycidyl ethers, prepared by reaction of epichlorohydrin or epibromohydrin with a polyphenol in the presence of alkali. Suitable polyphenols therefor are, for example, resorcinol, pyrocatechol, hydroquinone, bisphenol A (bis(4-hydroxyphenyl)-2,2-propane), bisphenol F (bis(4-hydroxyphenyl)-methane), bisphenol S, biphenol, bis(4-hydroxyphenyl)-1,1-isobutane, 4,4'-dihydroxy-benzophenone, bis(4-hydroxyphenyl)-1,1-ethane, and 1,5-hydroxy-naphthalene. Other suitable polyphenols as the basis for the polyglycidyl ethers are the known condensation products of phenol and formaldehyde or acetaldehyde of the novolak resin-type.

Other epoxies suitable for use herein are the polyglycidyl ethers of polyalcohols or diamines. Such polyglycidyl ethers are derived from polyalcohols, such as ethylene glycol, diethylene glycol, triethylene glycol, 1,2-propylene glycol, 1,4-butylene glycol, triethylene glycol, 1,5-pentanediol, 1,6-hexanediol or trimethylolpropane.

Still other epoxies are polyglycidyl esters of polycarboxylic acids, for example, reaction products of glycidol or epichlorohydrin with aliphatic or aromatic polycarboxylic acids, such as oxalic acid, succinic acid, glutaric acid, terephthalic acid or a dimeric fatty acid.

And still other epoxides are derived from the epoxidation products of olefinically-unsaturated cycloaliphatic compounds or from natural oils and fats.

Particularly desirable are liquid epoxy resins derived from the reaction of bisphenol A or bisphenol F and epichlorohydrin. The epoxy resins that are liquid at room temperature generally have epoxy equivalent weights of from 150 to about 480.

Typically, the matrix resin may contain from about 25 to about 55 weight percent, such as from about 30 to about 50 weight percent of epoxy.

The composition may include as at least a portion of the epoxy component a reactive diluent such as a mono-epoxide (e.g., monoglycidyl ethers of alkyl- and alkenyl-substituted phenols).

In addition to epoxy, episulfide is desirable as well, whether they are full or partial episulfides, provided that they are in the solid state. Episulfides may be commercially available or readily prepared from the corresponding epoxy through known synthetic methods.

As noted, the matrix resin may also include one or more of cyanate ester, maleimide, nadimide, itaconimide, phenolic and/or thiophenolic.

The curing agent may be selected from nitrogen-containing compounds such as amine compounds, amide compounds, imidazole compounds, guanidine compounds, urea compounds and derivatives and combinations thereof.

For instance, the amine compounds may be selected from aliphatic polyamines, aromatic polyamines, and alicyclic polyamines, such as diethylenetriamine, triethylenetetramine, diethylaminopropylamine, xylenediamine, diaminodiphenylamine, isophoronediamine, menthenediamine and combinations thereof.

In addition, modified amine compounds, may be used, which include epoxy amine additives formed by the addition of an amine compound to an epoxy compound, for instance, novolac-type resin modified through reaction with aliphatic amines.

The imidazole compounds may be selected from imidazole, isoimidazole, alkyl-substituted imidazoles, and combinations thereof. More specifically, the imidazole compounds are selected from 2-methyl imidazole, 2-ethyl-4-methylimidazole, 2,4-dimethylimidazole, butylimidazole, 2-heptadecenyl-4-methylimidazole, 2-undecenylimidazole, 1-vinyl-2-methylimidazole, 2-n-heptadecylimidazole, 2-undecylimidazole, 1-benzyl-2-methylimidazole, 1-propyl-2-methylimidazole, 1-cyanoethyl-2-methylimidazole, 1-cyanoethyl-2-ethyl-4-methylimidazole, 1-cyanoethyl-2-undecylimidazole, 1-cyanoethyl-2-phenylimidazole, 1-guanaminoethyl-2-methylimidazole and addition products of an imidazole and trimellitic acid, 2-n-heptadecyl-4-methylimidazole, aryl-substituted imidazoles, phenylimidazole, benzylimidazole, 2-methyl-4,5-diphenylimidazole, 2,3,5-triphenylimidazole, 2-styrylimidazole, 1-(dodecyl benzyl)-2-methylimidazole, 2-(2-hydroxyl-4-t-butylphenyl)-4,5-diphenylimidazole, 2-(2-methoxyphenyl)-4,5-diphenylimidazole, 2-(3-hydroxyphenyl)-4,5-diphenylimidazole, 2-(p-dimethylaminophenyl)-4,5-diphenylimidazole, 2-(2-hydroxyphenyl)-4,5-diphenylimidazole, di(4,5-diphenyl-2-imidazole)-benzene-1,4,2-naphthyl-4,5-diphenylimidazole, 1-benzyl-2-methylimidazole, 2-p-methoxystyrylimidazole, and combinations thereof.

Modified imidazole compounds may be used as well, which include imidazole adducts formed by the addition of an imidazole compound to an epoxy compound.

Guanidines, substituted guanidines, substituted ureas, melamine resins, guanamine derivatives, cyclic tertiary amines, aromatic amines and/or mixtures thereof. Examples of substituted guanidines are methyl-guanidine, dimethyl-guanidine, trimethylguanidine, tetra-methylguanidine, methylisobiguanidine, dimethylisobiguanidine, tetramethyliso-biguanidine, hexamethylisobiguanidine, heptamethylisobiguanidine and cyanoguanidine (dicyandiamide). Representative guanamine derivatives include alkylated benzoguanamine resins, benzoguanamine resins and methoxymethylethoxy-methylbenzoguanamine.

In addition to or instead of these hardeners, catalytically-active substituted ureas may be used. For instance, p-chlorophenyl-N,N-dimethylurea (monuron), 3-phenyl-1,1-dimethylurea (fenuron) or 3,4-dichlorophenyl-N,N-dimethylurea (diuron) are representative examples.

The amount of curing agent may depend upon a number of factors, including whether the curing agent acts as a catalyst or participates directly in crosslinking of the composition, the concentration of epoxy groups and other reactive groups in the composition, the desired curing rate and the like.

The curing agent should be present in an amount in the range of about 0.01 to about 40 percent by weight, such as about 0.5 to about 20 percent by weight, desirably about 1 to about 15 percent by weight, based on the total weight of the matrix resin.

The matrix resin may further include nanostructures constructed from a conductive material. The nanostructures are in the shape of one or more of nanotubes, nanocubes, nanowires, nanopyramids, nanoplatelets, nanospheres and multiply twinned particles. The conductive material may be a metal, such as copper, silver or nickel, or carbon. Examples of the nanostructures may be found in U.S. Pat. Nos. 7,585,349, 7,922,787, 8,049,333 and 8,454,859.

When used, the nanostructures should be present in an amount in the range of about 0.01 to about 40 percent by weight, such as about 0.5 to about 20 percent by weight, desirably about 1 to about 15 percent by weight, based on the total weight of the matrix resin.

The matrix resin should be used to make the conductive prepreg in an amount in the range of about 5 to about 60 percent by weight, such as about 10 to about 50 percent by weight, desirably about 15 to about 35 percent by weight, based on the total weight of the prepreg.

The fiber may be constructed from unidirectional fibers, woven fibers, chopped fibers, non-woven fibers or long, discontinuous fibers.

The fiber used in the conductive prepreg may be constructed from carbon, glass, aramid, boron, polyalkylene, quartz, polybenzimidazole, polyetheretherketone, polyphenylene sulfide, poly p-phenylene benzobisoaxazole, silicon carbide, phenolformaldehyde, phthalate and napthenoate.

When the fiber is constructed from glass, the glass fiber should be selected from the group consisting of S glass, S2 glass, E glass, R glass, A glass, AR glass, C glass, D glass, ECR glass, glass filament, staple glass, T glass and zirconium oxide glass.

When the fiber is constructed from carbon, the carbon fiber should be made from pitch, polyacrylonitrile or rayon. The carbon fiber is desirable sized with an appropriate sizing agent, such as a benzoxazine-containing sizing agent.

Prepregs formed from fibers, which may be laid up in a layer format, and infused with the matrix resin are also provided.

In this regard, processes for producing a conductive prepreg are also provided. One such process includes the steps of (a) providing one or more pyrolized organic layer(s); (b) providing fibers, such as in a layer format; (c) providing the matrix resin, optionally, with nanostructures dispersed thoughout; and (d) joining the pyrolized organic layer(s), the fibers and the matrix resin to form a conductive prepreg assembly, and exposing the resulting conductive prepreg assembly to elevated temperature and pressure conditions sufficient to infuse the fibers and pyrolized organic layer(s) with the matrix resin to form a conductive prepreg.

Another such process for producing a conductive prepreg, includes the steps of (a) providing one or more pyrolized organic layer(s); (b) providing fibers; (c) providing the matrix resin in liquid form; (d) passing the pyrolized organic layer(s) and the fibers through the liquid matrix resin to infuse the pyrolized organic layer(s) and the fibers with the matrix resin to form a conductive prepreg assembly; and (e) removing excess matrix resin from the conductive prepreg assembly.

Still another process provides a method of substantially maintaining electrical conductivity of a conductive prepreg while reducing the overall weight of the conductive prepreg. The steps here include Providing a matrix resin and fiber; and Providing one or more pyrolized organic layer(s), where the pyrolized organic layer(s) demonstrate(s) an electrical conductivity of about 5 to $30 \times 10^5$ Siemens per meter at a weight that is about 10% to about 95% less than the amount of copper mesh required to demonstrate substantially the same electrical conductivity.

The matrix resin should have a viscosity in the range of 1000 to 20000 cps at an impregnation temperature of 160° F. to 250° F. In addition, the time within which the viscosity of the matrix resin increases by 100% under the process conditions is in the range of 30 minutes to 10 hours.

The conductive prepreg, particularly when formed by these processes, demonstrates electrical conductivity in the x direction of about 5 to $30 \times 10^5$ Siemens per meter. In the y direction, conductivity is about 5 to $30 \times 10^5$ Siemens per meter.

Also provided herein are cured conductive prepregs made by these processes.

And provided herein are laminates comprising either: at least one conductive prepreg according to that which is disclosed herein and a nonconductive prepreg, where the nonconductive prepreg is made with a matrix resin comprising a benzoxazine resin, or at least two conductive prepregs according to that which is disclosed herein.

The laminates may be made in a unidirectional, woven or quasi isotropic structure.

The following examples are provided for illustrative rather than limiting purposes.

EXAMPLES

A matrix resin for use in making a conductive prepreg with carbon fiber with the noted components in the specified amount is set forth in the table below.

| Component | Weight % |
| --- | --- |
| Oxazine | 54 |
| Epoxy Resin | 18 |
| Core Shell | 5 |
| Epoxy-terminated epoxy adduct* | 10 |
| Diethylamine salt of trifluoromethanesulfonic acid | 0.5 |
| Defoamer | 0.5 |
| RADEL 105 SFP | 12 |
| NIPOL | 0.3 |

*epoxy terminated adduct of two different epoxy materials using bisphenol A as a linking portion.

This matrix resin was used to manufacture the control benzoxazine prepreg. The matrix resin with 2 percent by weight carbon nanotube addition was also used to manufacture a conductive prepreg. Both resin matrices were impregnated into Toho IMS65 E23 (1.3% size) 24K carbon fiber to make unidirectional prepreg with fiber areal weight ("FAW") of 190 gsm and matrix resin content ("RC") of 35% by weight.

A state of the art commercial unidirectional prepreg (epoxy prepreg sold by Cytec Corporation under the trade designation 977-2) used Toho IMS 24K carbon fiber and had a FAW of 190 grams per square meter (gsm) and RC of 35% by weight. The unidirectional prepreg process provides for the collimation of individual fiber tows that are comprised of 24,000 individual fibers into a thin layer and combining with a thin film of matrix resin using pressure and temperature to form a resin impregnated sheet of carbon fiber.

The laminate constructions were eight ply quasi-isotropic $(+45/0/-45/90)_s$. One conductive ply was added to each laminate construction to demonstrate the benefits and advantages achievable by the present invention. The conductive ply should be positioned such that it faces the environment in which the laminate will be used. For an aircraft wing, for instance, the conductive ply should be positioned so that it faces outward toward the environment, rather than inward toward the center of the laminate.

The laminates were autoclave cured using a 1.7° C./minute ramp rate to a temperature of 177° C., with a 2 hour hold at that temperature and cool at rate of 1.7° C./minute to a temperature of 50° C. with 90 psi autoclave pressure.

Analysis of the conductive prepreg mechanical test data showed compression after impact ("CAI") of 253 Mpa and in-plane shear strength ("IPS") of 125 Mpa. Commercial literature for the state-of-the-art epoxy prepreg Cytec 977-2 shows CAI of 262 Mpa and IPS of 101 Mpa. This data demonstrates that the mechanical performance of prepregs according to the present invention is at least similar to, and in some cases better than, a state of the art epoxy prepreg.

Compression After Impact test method ASTM D7136-12, Standard Test Method for Measuring the Damage Resistance of a Fiber-Reinforced Polymer Matrix Composite to a Drop-Weight Impact Event and IPS test method ASTM D3518, Standard Test Method for In-Plane Shear Response of Polymer Matrix Composite Materials by Tensile Test of ±45° Laminate were used to obtain mechanical performance data.

Zone 3 lightning strike performance tested to Society of Automotive Engineers (SAE), APR5416, Aircraft Lightning Test Methods is shown in the table set forth in FIG. 1. Prepregs made from carbon fiber and a matrix resin that is either based upon epoxy or benzoxazine without conductive ply showed low conductivity and failed zone 3 strike with large damage area and deep penetration into the laminate. Addition of copper mesh ply to carbon benzoxazine prepreg improved conductivity, and passed strike with low laminate damage. However, weight increased significantly. Replacement of the copper mesh ply with a pyrolized layer and the addition of carbon nanotube additive to the matrix resin showed the highest conductivity, passed strike with low damage area and low ply damage. Significantly, a 95% decrease in conductive ply weight was observed compared to the copper mesh. Laminate conductivity increased by 45% compared to the carbon nanotube containing laminate and 140% compared to the laminate with copper mesh conductive ply.

What is claimed is:

1. A conductive prepreg, comprising
   A matrix resin;
   Fiber; and
   One or more pyrolized organic layer(s) on at least a portion of a surface of which is disposed conductive metal.
2. The conductive prepreg of claim 1 wherein the conductive metal is copper, silver or nickel.
3. The conductive prepreg of claim 2, wherein the pyrolized organic layer has a thickness of about 25 to about 40 micrometers.
4. The conductive prepreg of claim 2 wherein the conductive metal is disposed on the pyrolized organic layer at a thickness of about 2 to about 4 micrometers.
5. The conductive prepreg of claim 1 wherein the pyrolized organic layer is a polyimide.
6. The conductive prepreg of claim 5, wherein the pyrolized organic layer has a thickness of about 25 to about 40 micrometers.
7. The conductive prepreg of claim 5 wherein the conductive metal is disposed on the pyrolized organic layer at a thickness of about 2 to about 4 micrometers.
8. The conductive prepreg of claim 1, wherein the pyrolized organic layer has a thickness of about 25 to about 40 micrometers.
9. The conductive prepreg of claim 8 wherein the conductive metal is disposed on the pyrolized organic layer at a thickness of about 2 to about 4 micrometers.
10. The conductive prepreg of claim 1 wherein the conductive metal is disposed on the pyrolized organic layer at a thickness of about 2 to about 4 micrometers.
11. The conductive prepreg of claim 1, wherein the matrix resin comprises one or more epoxies, episulfides, oxetanes, thioxetanes, maleimides, nadimides, itaconimides, oxazines, cyanate esters, and bisoxazolines.
12. The conductive prepreg of claim 1, wherein the matrix resin further comprises nanostructures constructed from a conductive material.
13. The conductive prepreg of claim 12, wherein the nanostructures are in the shape of one or more of nanotubes, nanocubes, nanowires, nanopyramids, nanoplatelets, nanospheres and multiply twinned particles.
14. The conductive prepreg of claim 1, wherein the fiber is a member selected from the group consisting of carbon, glass, aramid, boron, polyalkylene, quartz, polybenzimidazole, polyetheretherketone, polyphenylene sulfide, poly p-phenylene benzobisoaxazole, silicon carbide, phenolformaldehyde, phthalate and napthenoate.
15. The conductive prepreg of claim 1, wherein the glass is a member selected from the group consisting of S glass, S2 glass, E glass, R glass, A glass, AR glass, C glass, D glass, ECR glass, glass filament, staple glass, T glass and zirconium oxide glass.
16. The conductive prepreg of claim 1, wherein the carbon fiber is made from pitch, polyacrylonitrile or rayon.
17. The conductive prepreg of claim 1, wherein the carbon fiber has been sized with a benzoxazine-containing sizing agent.
18. The conductive prepreg of claim 1, demonstrating electrical conductivity in the x direction of about 5 to $30 \times 10^5$ Siemens per meter.
19. The conductive prepreg of claim 1, demonstrating electrical conductivity in the y direction of about 5 to $30 \times 10^5$ Siemens per meter.
20. Cured conductive prepreg according to claim 1.
21. Laminate comprising at least one of the conductive prepreg according to claim 1 and a nonconductive prepreg.
22. Laminate according to claim 21, wherein the nonconductive prepreg is made with a matrix resin comprising a benzoxazine resin.
23. Laminate comprising at least two of the conductive prepregs according to claim 1.
24. Laminate according to claim 23, in a unidirectional, woven or quasi isotropic structure.
25. A method of substantially maintaining electrical conductivity of a conductive prepreg of claim 1 while reducing the overall weight of the conductive prepreg, comprising the steps of:
   Providing a matrix resin and fiber; and
   Providing a pyrolized organic layer,
wherein the pyrolized organic layer demonstrates an electrical conductivity of about 5 to $30 \times 10^5$ Siemens per meter at a weight that is about 10% to about 95% less than the amount of copper mesh required to demonstrate substantially the same electrical conductivity.

* * * * *